United States Patent
Kim et al.

(10) Patent No.: US 9,323,372 B2
(45) Date of Patent: Apr. 26, 2016

(54) FLAT PANEL DISPLAY INTEGRATED WITH TOUCH SCREEN PANEL

(75) Inventors: Do-Youb Kim, Yongin (KR); Brent Jang, Yongin (KR); Won-Kyu Kwak, Yongin (KR); Ja-Seung Ku, Yongin (KR); Soon-Sung Ahn, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 706 days.

(21) Appl. No.: 12/801,795

(22) Filed: Jun. 25, 2010

(65) Prior Publication Data

US 2011/0134056 A1  Jun. 9, 2011

(30) Foreign Application Priority Data

Dec. 3, 2009  (KR) .................. 10-2009-0119204

(51) Int. Cl.
*G06F 3/045* (2006.01)
*G06F 3/044* (2006.01)
*G06F 3/041* (2006.01)

(52) U.S. Cl.
CPC .............. *G06F 3/0412* (2013.01); *G06F 3/044* (2013.01); *G06F 2203/04111* (2013.01)

(58) Field of Classification Search
CPC ...................................................... G06F 3/044
USPC ................................ 345/173, 174; 178/18.06
See application file for complete search history.

(56) References Cited

U.S. PATENT DOCUMENTS

| 6,179,679 | B1 | 1/2001 | Von Gutfeld et al. |
| 6,720,944 | B1 | 4/2004 | Ishii et al. |
| 7,280,167 | B2 | 10/2007 | Choi et al. |
| 2004/0165120 | A1* | 8/2004 | Woo et al. ............. 349/42 |
| 2004/0233175 | A1* | 11/2004 | Chuang ............. 345/173 |
| 2005/0270464 | A1* | 12/2005 | Seo et al. ............. 349/139 |
| 2006/0007165 | A1 | 1/2006 | Yang et al. |
| 2007/0170854 | A1 | 7/2007 | Kwak |

(Continued)

FOREIGN PATENT DOCUMENTS

| CN | 1295311 A | 5/2001 |
| CN | 101009298 A | 8/2007 |

(Continued)

OTHER PUBLICATIONS

Chinese Office action dated Dec. 4, 2012 for CN 201010222026.2, Kim, et al.

(Continued)

*Primary Examiner* — Adam J Snyder
(74) *Attorney, Agent, or Firm* — Lee & Morse, P.C.

(57) ABSTRACT

A FPD integrated with a touch screen panel includes an upper substrate and a lower substrate facing each other, the upper substrate including a display region and first and second non-display regions surrounding the display region, a plurality of sensing patterns on the display region of the upper substrate, a plurality of sensing lines on the first non-display region of the upper substrate, a sealing material on the second non-display region of the upper substrate, the sealing material connecting the upper and lower substrates, and a flexible printed circuit (FPC) bonding pad unit on the second non-display region of the upper substrate, the FPC bonding pad unit including a plurality of bonding pads coupled to the plurality of sensing lines, the bonding pads including a transparent conductive material in regions overlapping the sealing material.

21 Claims, 4 Drawing Sheets

(56) References Cited

U.S. PATENT DOCUMENTS

| | | | |
|---|---|---|---|
| 2007/0181456 A1* | 8/2007 | Kusuda et al. | 206/443 |
| 2008/0062140 A1 | 3/2008 | Hotelling et al. | |
| 2008/0224971 A1* | 9/2008 | Utsunomiya et al. | 345/87 |
| 2009/0033634 A1* | 2/2009 | Shih et al. | 345/173 |
| 2009/0096754 A1* | 4/2009 | Hinata | 345/173 |
| 2009/0194342 A1* | 8/2009 | Kuo et al. | 178/18.03 |
| 2009/0195516 A1 | 8/2009 | Kuo et al. | |
| 2010/0053534 A1* | 3/2010 | Hsieh et al. | 349/155 |
| 2010/0225613 A1* | 9/2010 | Iwasaki | 345/174 |

FOREIGN PATENT DOCUMENTS

| | | |
|---|---|---|
| JP | 2004-355292 A | 12/2004 |
| JP | 2005-063423 A | 3/2005 |
| JP | 2005-107655 A | 4/2005 |
| JP | 2005-339290 A | 12/2005 |
| JP | 2007-200835 A | 8/2007 |
| JP | 2008-040290 A | 2/2008 |
| JP | 2009-103780 A | 5/2009 |
| JP | 2009-104841 A | 5/2009 |
| JP | 2009-123106 A | 6/2009 |
| KR | 10 2001-0066420 A | 7/2001 |
| KR | 10 2007-0119560 A | 12/2007 |
| KR | 10-2008-0043414 A | 5/2008 |
| KR | 10-0902211 B1 | 6/2009 |
| TW | 200600884 A | 1/2006 |
| TW | 200935277 A | 8/2009 |
| WO | WO 00/07170 | 2/2000 |

OTHER PUBLICATIONS

European Extended Search Report in EP 10177766.2-2224, dated Dec. 15, 2010 (Kim, et al.).
Korean Office Actions in KR 10-2009-0119204, dated Oct. 31, 2011 (Kim, et al.).
Japanese Notice of Allowance in JP 2010-057406, dated May 8, 2012 (Kim, et al.).
Taiwanese Office Action Dated Jan. 8, 2014.

* cited by examiner

FLAT PANEL DISPLAY INTEGRATED WITH TOUCH SCREEN PANEL

BACKGROUND

1. Field

Example embodiments relate to a flat panel display (FPD). More particularly, example embodiments relate to an FPD integrated with a touch screen panel.

2. Description of the Related Art

A touch screen panel is an input device on a screen, e.g., on an image display device, for selecting instruction/command content, e.g., by a human hand or an object, of a user. For example, a conventional touch screen panel may be provided on a front surface of the image display device to convert a contact position, e.g., of a human hand or an object, into an electrical signal. Therefore, the instruction content selected by the contact position may be received by the image display device as an input signal. The touch screen panel may replace an additional input device coupled to the image display device, e.g., to operate a keyboard and/or a mouse.

The touch screen panel may be realized by several methods, e.g., a resistance layer method, an optical sensing method, and an electrostatic capacitance method. For example, a touch screen panel realized by the electrostatic capacitance method may sense a change in the electrostatic capacitance formed by a conductive sensing pattern and a peripheral sensing pattern or a ground electrode, when the touch screen panel is contacted to generate the electrical signal.

The touch screen panel may be attached to a front surface of a FPD, e.g., a liquid crystal display (LCD), an organic light emitting diode (OLED) display, etc. When the conventional touch screen panel is attached to the FPD, an entire thickness of a product may increase, so that manufacturing cost may increase.

SUMMARY

Embodiments are directed to a FPD integrated with a touch screen panel, which substantially overcome one or more of the problems due to the limitations and disadvantages of the related art.

It is therefore a feature of an embodiment to provide a FPD with a touch screen panel directly on an upper substrate thereof, so that a flexible printed circuit (FPC) bonding pad unit of the touch screen panel overlapping a sealing material between the upper and lower substrates of the FPD is transparent.

At least one of the above and other features and advantages may be realized by providing a FPD integrated with a touch screen panel, including an upper substrate and a lower substrate facing each other, the upper substrate including a display region and first and second non-display regions surrounding the display region, a plurality of sensing patterns on the display region of the upper substrate, a plurality of sensing lines on the first non-display region of the upper substrate, a sealing material on the second non-display region of the upper substrate, the sealing material connecting the upper and lower substrates, and a flexible printed circuit (FPC) bonding pad unit on the second non-display region of the upper substrate, the FPC bonding pad unit including a plurality of bonding pads coupled to the plurality of sensing lines, the bonding pads including a transparent conductive material in regions overlapping the sealing material The bonding pads of the FPC bonding pad unit may include a first region that overlaps the sealing material and a second region that does not overlap the sealing material, the structures of the first region and the second region being different from each other.

The first region of the bonding pad may include a first insulating layer formed on the second non-display region of the upper substrate so that a predetermined region is opened, a transparent conductive pattern formed to include the opened region, and a second insulating layer in which a region that overlaps the transparent conductive pattern is opened so that the transparent conductive pattern is exposed.

The second region of the bonding pad may include an opaque metal pattern formed on the second non-display region of the upper substrate, a first insulating layer in which a region that overlaps the opaque metal pattern is opened so that the opaque metal pattern is exposed, a transparent conductive pattern formed in a region that overlaps the exposed opaque metal pattern, and a second insulating layer in which a region that overlaps the transparent conductive pattern is opened so that the transparent conductive pattern is exposed. The opaque metal pattern is made of the same material as the sensing lines.

The opaque metal pattern may be separated from the sealing material by a predetermined distance. The predetermined distance may be about 100 μm.

Island-shaped opaque metal patterns may be further formed under the transparent conductive pattern. Slit-shaped opaque metal patterns may be further formed under the transparent conductive pattern.

Portions of the bonding pads overlapping the sealing material may include only the transparent conductive material. The sensing lines may be coupled to the bonding pads via opaque metal patterns, the metal patterns being positioned not to overlap the sealing material. The sensing lines may be coupled to the bonding pads via metal patterns, the bonding pads extending along a first direction, and the metal patterns being spaced apart from the sealing material along the first direction. Portions of the bonding pads overlapping the sealing material and including the transparent conductive material may be directly on the upper substrate.

The sensing patterns may include X sensing patterns and Y sensing patterns formed in different layers. The X sensing patterns may be patterned to be coupled to each other in a first direction and the Y sensing patterns may be patterned to be coupled to each other in a second direction that intersects the first direction.

The transparent conductive material of the bonding pads may be configured to transmit laser light irradiation therethrough, so the sealing material may be melted by radiating laser light, and the melted sealing material may be hardened so that the upper substrate and the lower substrate are attached to each other.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0119204, filed on Dec. 3, 2009, in the Korean Intellectual Property Office, and entitled: "Flat Panel Display Integrated with Touch Screen Panel," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will also be understood that when an element is referred to as being "between" two elements, it can be the only element between the two elements, or one or more intervening elements may also be present. In addition, it will be understood that when an element is referred to as being "connected to" or "coupled to" another element, it can be directly connected or coupled to the element or one or more intervening elements may be interposed therebetween. Like reference numerals refer to like elements throughout.

Figure 1:
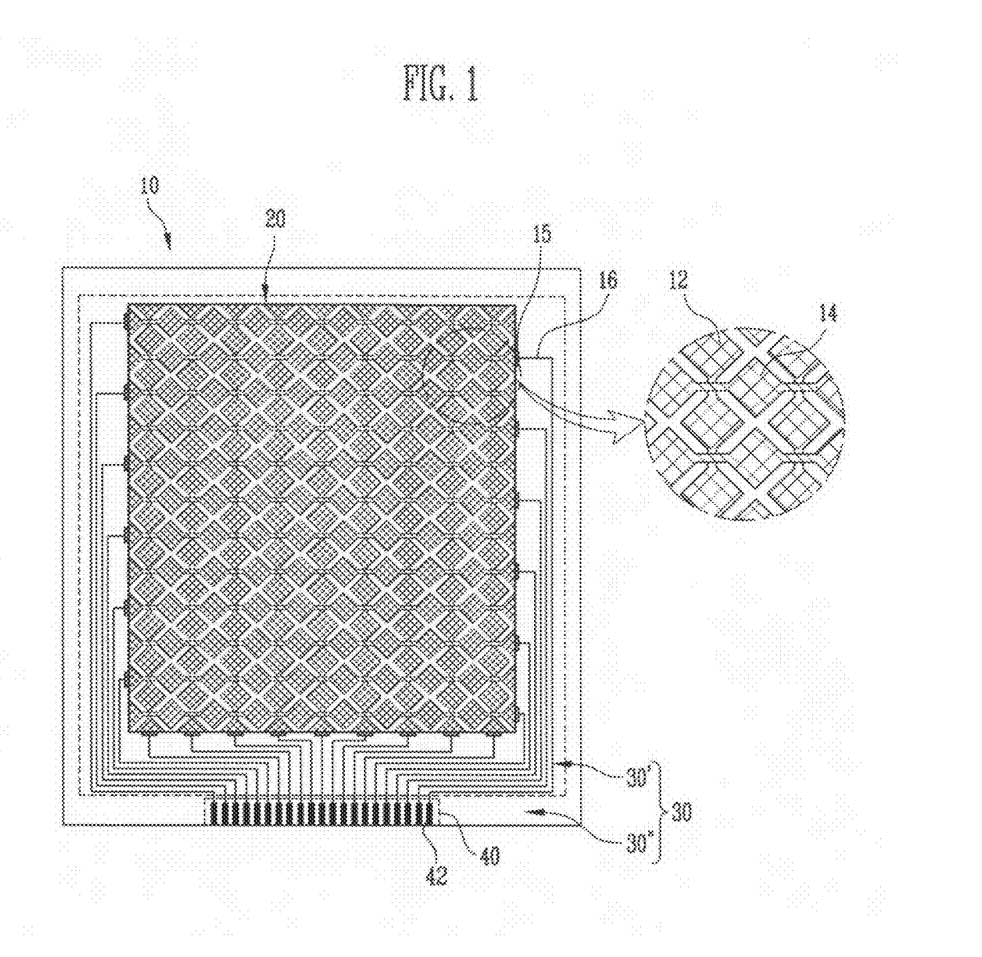
FIG. 1 illustrates a plan view of an upper substrate of a FPD according to an embodiment.

Hereinafter, a FPD according to embodiments will be described in detail with reference to FIGS. 1-3. FIG. 1 illustrates a plan view of an upper substrate of a FPD according to an embodiment, FIG. 2 illustrates a plan view of a lower substrate of the FPD in FIG. 1, and FIG. 3 illustrates a partial cross-sectional view of a connection between the upper and lower substrates of the FPD in FIG. 1.

Figure 2:
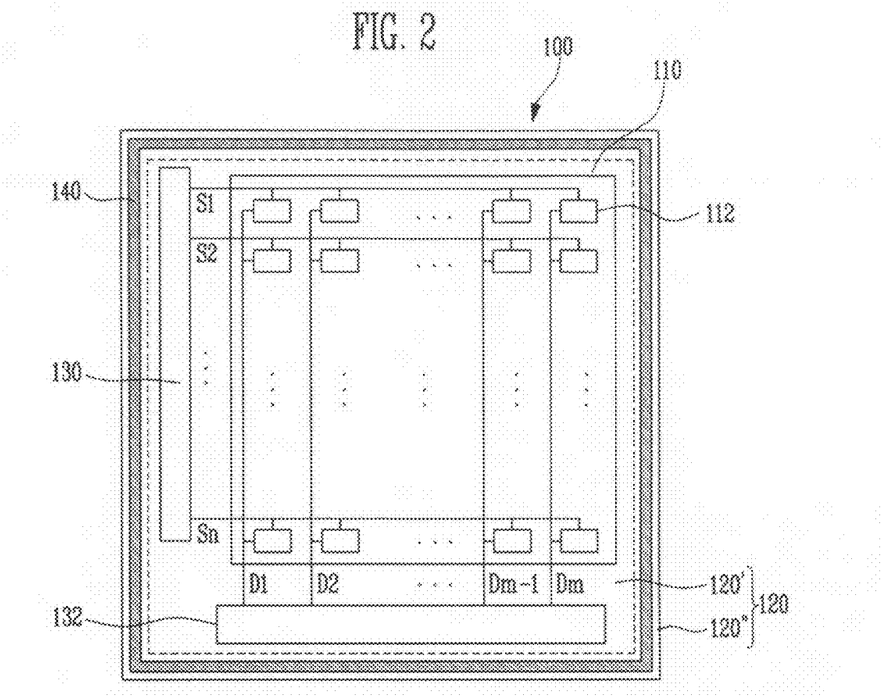
FIG. 2 illustrates a plan view of a lower substrate of the FPD of FIG. 1.
Figure 3:
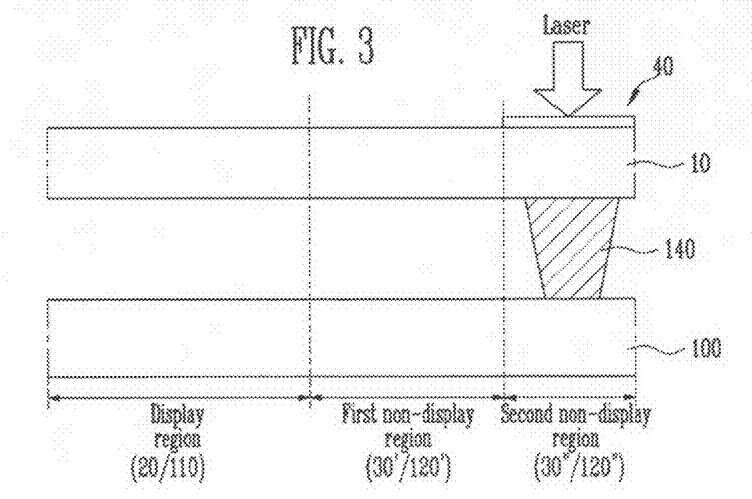
FIG. 3 illustrates a cross-sectional view of a partial region of a FPD according to an embodiment.

Referring to FIGS. 1-3, a FPD according to embodiments may include a lower substrate 100 and an upper substrate 10 connected to each other via a sealing material 140. A touch screen panel may be formed on, e.g., directly on, the upper substrate 10 of the FPD. The FPD may be, e.g., an OLED display or a LCD. For example, if the FPD is an OLED display, the upper substrate 10 may be an encapsulation substrate of the OLED display, and may be made of a transparent material, e.g., a glass substrate.

Referring to FIG. 1, the touch screen panel according to embodiments may include a plurality of sensing patterns 12 and 14 on the upper substrate 10, i.e., the encapsulation substrate. As further illustrated in FIG. 1, the touch screen panel may include metal pads 15 electrically coupled to the sensing patterns 12 and 14, and sensing lines 16.

The touch screen panel may be attached to the upper substrate 10 to overlap a display region 20 of the upper substrate 10. That is, the plurality of sensing patterns 12 and 14 may be formed on the display region 20 of the upper substrate 10, i.e., a region in which an image is displayed to detect a touch position. The metal pads 15 and the sensing lines 16 electrically coupled to the sensing patterns 12 and 14 may be formed in a non-display region 30 of the upper substrate 10.

As illustrated in FIG. 1, the non-display region 30 may be peripheral to the display region 20, e.g., the non-display region 30 may surround the display region 20. As further illustrated in FIG. 1, the non-display region 30 may be divided into a first non-display region 30', i.e., a region in which the metal pads 15 and the sensing lines 16 are formed, and a second non-display region 30", i.e., a region in which a FPC bonding pad unit 40 is formed. The second non-display region 30" may surround, e.g., completely surround, the first non-display region 30', so the first non-display region 30' may be between the display region 20 and the second non-display region 30". It is noted that the FPC bonding pad unit 40 in the second non-display unit 30" may include a plurality of bonding pads 42 coupled to the sensing lines 16, and will be described in more detail below with reference to FIGS. 4A and 4B.

The second non-display region 30" of the upper substrate 10 may be coated with the sealing material 140 (FIG. 3), so the sealing material 140 may be formed between the upper substrate 10 and the lower substrate 100 in order to attach the upper substrate 10 and the lower substrate 100 of the FPD to each other. Laser light may be irradiated onto the second non-display region 30", so that the sealing material 140 may be hardened to attach the upper substrate 10 and the lower substrate 100 to each other.

As illustrated in FIG. 1, the plurality of sensing patterns 12 and 14 formed in the display region 20 may be alternately arranged to include X sensing patterns 12 and Y sensing patterns 14 coupled to each other. That is, the X sensing patterns 12 may be connected in units of columns having the same X coordinates, and the Y sensing patterns 14 may be connected in units of rows having the same Y coordinates. It is noted that "sensing patterns 12 and 14" and "X and Y sensing patterns 12 and 14" will be used hereinafter interchangeably.

For example, the X sensing patterns 12 may include a plurality of patterns arranged in columns, so the patterns within each column may have the same X coordinate and may be coupled to each other in a first direction (column direction). Similarly, the Y sensing patterns 14 may include a plurality of patterns arranged in rows, so the patterns in each row may have the same Y coordinate and may be coupled to each other in a second direction (row direction).

The X and Y sensing patterns 12 and 14 may be formed in different layers with an insulating layer (not shown) interposed therebetween. In this case, with respect to the patterning process, the X sensing patterns 12 may be patterned to be coupled to each other in the first direction, and the Y sensing patterns 14 may be patterned to be coupled to each other in the second direction. Therefore, a process of forming additional contact holes and coupling patterns may be omitted, so that the number of masks may be reduced and processes may be simplified. Example embodiments are not limited to the above.

For example, the X and Y sensing patterns 12 and 14 may be formed in the same layer, e.g., both the X and Y sensing patterns 12 and 14 may be formed directly on the upper substrate 10. In this case, a first portion of the X and Y sensing patterns 12 and 14 may be coupled to each other in a first direction in the patterning process, and a second portion of the X and Y sensing patterns 12 and 14, i.e., the remaining sensing patterns, may be coupled to each other in the second direction.

As illustrated in FIG. 1, the metal pads 15 of the touch screen panel may be arranged at an edge of the display region 20 where the X and Y sensing patterns 12 and 14 are formed. That is, the metal pads 15 may be at an end of the first non-display region 30', e.g., at a boundary line between the display region 20 and the first non-display region 30', to couple the X and Y sensing patterns 12 and 14 to the plurality of sensing lines 16 formed on the first non-display region 30'. For example, the metal pads 15 may electrically couple the X and Y sensing patterns 12 and 14 in units of one column or row to the sensing lines 16, so that a contact sensing signal may be supplied to a driving circuit for driving the touch screen panel.

For example, the metal pads 15 may electrically couple the X sensing patterns 12 in units of one column to the sensing lines 16, and may electrically couple the Y sensing patterns 14 in units of one row to the sensing lines 16. The sensing lines 16 may be coupled to the X and Y sensing patterns 12 and 14 through the metal pads 15 to couple the X and Y sensing patterns 12 and 14 to a driving circuit (not shown). For example, the metal pads 15 and the sensing lines 16 may be made of a low resistance opaque metal material.

The touch screen panel may be coupled to a FPC (not shown), on which an external driving circuit (not shown) may be mounted through the FPC bonding pad unit 40. The sensing lines 16 may be coupled between the FPC bonding pad unit 40 and the sensing patterns 12 and 14.

When the touch screen panel realized by an electrostatic capacitance method is contacted by an object, e.g., a human hand or a touch stick, a change in the electrostatic capacitance in accordance with the contact position may be transmitted from the X and Y sensing patterns 12 and 14 to the driving circuit via the metal pads 15 and the sensing lines 16. Then, a change in the electrostatic capacitance may be converted into an electrical signal by X and Y input processing circuits (not shown), so that the contact position may be registered.

Referring to FIG. 2, the lower substrate 100 corresponding to the upper substrate 10 may include a display region 110 with pixels 112 and a non-display region 120. Each of the pixels 112 in the display region 110 may include an OLED having a first electrode, at least one organic layer, and a second electrode. The non-display region 120 may be formed to surround the display region 110.

In the display region 110, a predetermined image may be displayed due to the light emitted from the OLEDs. The non-display region 120 may be divided into a first non-display region 120', i.e., a region including a data driving circuit 132 and a scan driving circuit 130 for driving the plurality of pixels 112, formed on the display region 110 and a second non-display region 120" surrounding the first non-display region 120', i.e., a region including the sealing material 140 for attaching the lower substrate 100 to the upper substrate 10. The display region 110 and the first and second non-display regions 120' and 120" of the lower substrate 100 may correspond to, e.g., overlap, the display region 20 and the first and second non-display regions 30' and 30" of the upper substrate 10, respectively.

The display region 110 may include a plurality of scan lines S1 to Sn arranged in a row direction, and a plurality of data lines D1 to Dm arranged in a column direction. In the display region 110, each of the plurality of pixels 112 receiving signals from the scan and data driving circuits 130 and 132 may be formed to be connected to a respective scan line of the scan lines S1 to Sn and a respective data line of the data lines D1 to Dm.

In the first non-display region 120', the scan and data driving circuits 130 and 132 may be formed. Further, metal wiring lines electrically coupled to the scan lines S1 to Sn and the data lines D1 to Dm of the display region 110 may be formed. It is noted that "driving circuits" may refer to the data driving circuit 132 and the scan driving circuit 130.

The sealing material 140 may be formed in the second non-display region 120". The sealing material 140 may be formed between the upper substrate 10 and the lower substrate 100, and may seal the display region 110 so that air may not penetrate into a region between the upper and lower substrates 10 and 110.

The sealing material 140 may include, e.g., a solid frit. In order to manufacture frit, heat may be applied to a glass material, followed by rapid temperature reduction to generate glass powder type frit. The glass powder type frit may be mixed with an oxide powder, and an organic material may be added to the frit/oxide powder mix to form a gel state paste. The resultant material may be annealed at a temperature between about 300° C. to about 500° C. to remove the organic material and to harden the gel state paste in order to finalize the solid frit.

As illustrated in FIG. 3, when the sealing material 140, e.g., the solid frit, is coated on the second non-display regions 30" and 120" of the respective upper and lower substrates 10 and 100, laser light may be irradiated onto the sealing material 140, e.g., through the upper substrate 10. Laser light irradiation may melt the sealing material 140, followed by hardening of the melted sealing material 140 in order to attach the upper substrate 10 and the lower substrate 100 to each other.

According to embodiments, the FPC bonding pad unit 40 may include bonding pads with transparent conductive portions in regions overlapping the sealing material 140 in order to improve laser light irradiation therethrough. In contrast, when bonding pads of a conventional FPC bonding pad unit that overlap the sealing material are made of an opaque metal, the FPC bonding pad unit may not transmit the laser light therethrough. That is, portions of the sealing material 140 that overlap regions of the conventional opaque bonding pads of the conventional FPC bonding pad unit may not undergo the melting and hardening processes. As such, the sealing material in the conventional display may not be completely hardened, so that the sealing material may peel off to expose an interior of the display to contaminants. As the FPC bonding pad unit 40 according to embodiments includes bonding pads with transparent conductive portions in regions overlapping the sealing material 140, it may be possible to prevent the sealing material from peeling.

Figure 4A:
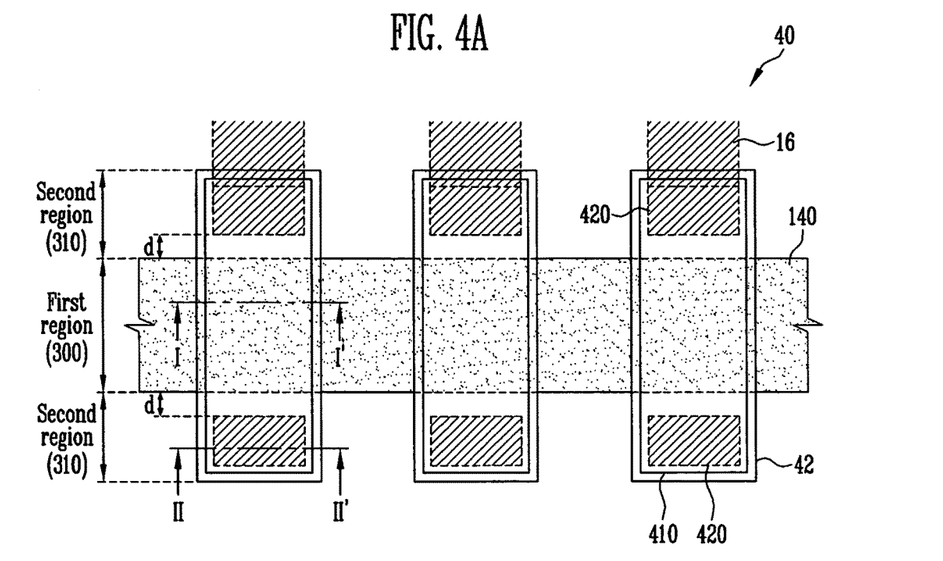
FIG. 4A illustrates an enlarged plan view of a FPC bonding pad unit according to an embodiment.
Figure 4B:
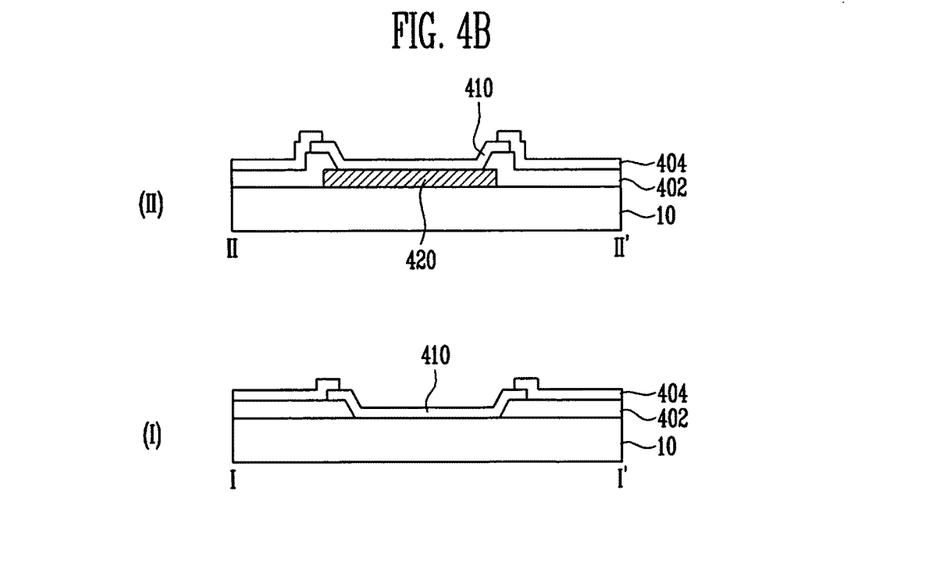
FIG. 4B illustrates cross-sectional views along lines I-I' and II-II' of FIG. 4A.

Hereinafter, a structure of the FPC bonding pad unit 40 according to embodiments will be described in more detail with reference to FIGS. 4A and 4B. FIG. 4A illustrates an enlarged plan view of the FPC bonding pad unit 40 according to an embodiment, and FIG. 4B illustrates cross-sectional views along lines I-I' and II-II' (respective parts I and II of FIG. 4B) of FIG. 4A.

Referring to FIGS. 1 and 4A, the FPC bonding pad unit 40 may include the plurality of bonding pads 42. The plurality of bonding pads 42 may be positioned in the second non-display region 30" in parallel to each other. The bonding pads 42 may be arranged perpendicularly to the sealing material 140. That is, if a longitudinal direction of the sealing material 140 extends along a first direction in parallel to edges of the first and second substrates 10 and 100, the bonding pads 42 thereabove may extend perpendicularly to the first direction, e.g., from an outermost edge of the second non-display region 30" toward a boundary line between the first and second non-display regions 30' and 30".

As illustrated in FIG. 4A, the bonding pads 42 may be divided into a first region 300, i.e., a region that overlaps the sealing material 140, and a second region 310, i.e., a region that does not overlap the sealing material 140. The structures of the first and second regions 300 and 310 of the bonding pads 42 are different from each other. For example, the first regions 300 of the bonding pads 42 may include only transparent material, e.g., no opaque metal may overlap the sealing material 140, while the second regions 310 of the bonding pads 42 may include opaque portions.

In detail, as illustrated in FIG. 4A, the bonding pads 42 may include transparent conductive patterns 410, e.g., each bonding pad 42 may include one transparent conductive pattern 410. The transparent conductive patterns 410 may extend along a direction substantially perpendicular to the first direction, and may overlap the first and second regions 300 and 310. The transparent conductive patterns 410 may, e.g., completely, overlap the sealing material 140, so laser light irradiated through the transparent conductive patterns 410 may reach the sealing material 140 for melting, and subsequent hardening, thereof. For example, as illustrated in FIG. 3, when laser light is irradiated through the FPC bonding pad unit 40, i.e., through the transparent conductive patterns 410 of the bonding pads 42, and through the glass upper substrate 10, sufficient heat from the laser light may be transmitted to reach the sealing material 140 for melting and hardening, so that it may be possible to prevent the sealing material 140 from peeling.

As further illustrated in FIG. 4A, the sensing lines 16 connecting the touch screen panel to the bonding pads 42 may include opaque metal patterns 420. The opaque metal pattern 420 may connect the sensing line 16 to the second region 310 of a respective bonding pad 42. That is, the opaque metal pattern 420 may be only in the second region 310 of the bonding pad 42, i.e., the opaque metal pattern 420 may not overlap any portion of the first region 300 of the bonding pad 42, so that the opaque metal pattern 420 and the sealing material 140 may not overlap. For example, as illustrated in FIG. 4A, the opaque metal pattern 420 positioned in the second region 310 may be separated from the sealing material 140 by a predetermined distance d not to overlap the sealing material 140. For example, the distance d may be about 100 µm in order to secure an alignment margin during manufacturing processes. The opaque metal patterns 420 may be coupled to the sensing lines 16 to transmit a change in the electrostatic capacitance sensed by the X and Y sensing patterns 12 and 14 to the driving circuit (not shown) mounted on the FPC (not shown).

As illustrated in part (II) of FIG. 4B, in the second region 310, the opaque metal pattern 420, i.e., a low resistance material, may be formed under the transparent conductive pattern 410 in order to reduce the high resistance value of the transparent conductive patterns 410 of the bonding pads 42. Referring to FIGS. 3 and 4B, in the first region 300, the transparent conductive patterns 410 may be formed on, e.g., directly on, the upper substrate 10. In the second regions 310, the opaque metal pattern 420 may be formed between the transparent conductive pattern 410 and the upper substrate 10. The upper substrate 10 may be positioned between the FPC bonding pad unit 40, i.e., the transparent conductive pattern 410, and the sealing material 140 in the first non-display region 30".

As further illustrated in part (II) of FIG. 4B with respect to the second region 310, the opaque metal pattern 420 may be formed on the upper substrate 10, and a first insulating layer 402 may be formed on the opaque metal pattern 420. The first insulating layer 402 may be open in a region that overlaps the opaque metal pattern 420, so that the opaque metal pattern 420 may be exposed. The transparent conductive pattern 410 may be formed in the region that overlaps the exposed opaque metal pattern 420, and a second insulating layer 404 may be formed on the transparent conductive pattern 410.

For example, the opaque metal pattern 420 may be formed of the same material as the sensing lines 16, e.g., on the same layer through the same process as the sensing lines 16. The transparent conductive pattern 410 may be formed of the same material as the X and Y sensing patterns 12 and 14, e.g., on the same layer through the same process as the X and Y sensing patterns 12 and 14. In this case, the second insulating layer 404 may be open in the region that overlaps the transparent conductive pattern 410, so that the transparent conductive pattern 410 may be exposed. The open transparent conductive pattern 410 may electrically contact the FPC on which the external driving circuit is mounted.

As illustrated in part (I) of FIG. 4B with respect to the first region 300, as compared with the second region 310, the opaque metal pattern 420 may not be formed on the upper substrate 10. That is, the first insulating layer 402 having a predetermined open region may be formed on, e.g., directly on, the upper substrate 10, so the transparent conductive pattern 410 may be formed in the open region of the second insulating layer 402. The second insulating layer 404 may be formed on the transparent conductive pattern 410. The second insulating layer 404 may be open in the region that overlaps the transparent conductive pattern 410, so that the transparent conductive pattern 410 may be exposed. The open transparent conductive pattern 410 may electrically contact the FPC on which the external driving circuit is mounted.

In the FPC bonding pad unit 40 according to embodiments, when a touch screen panel is integrally formed on the upper substrate 10 of the FPD, a region of the bonding pads 42 overlapping the sealing material 140 is made of a transparent conductive material to transmit laser light that melts and hardens the sealing material 140. Therefore, it may be possible to prevent or substantially minimize peeling of the sealing material 140. In addition, in the second region 310, the low resistance opaque metal pattern 420 may be formed under the transparent conductive pattern 410, so that the resistance value of the bonding pads 42 made of high resistance transparent conductive material may be reduced.

Figure 5A:
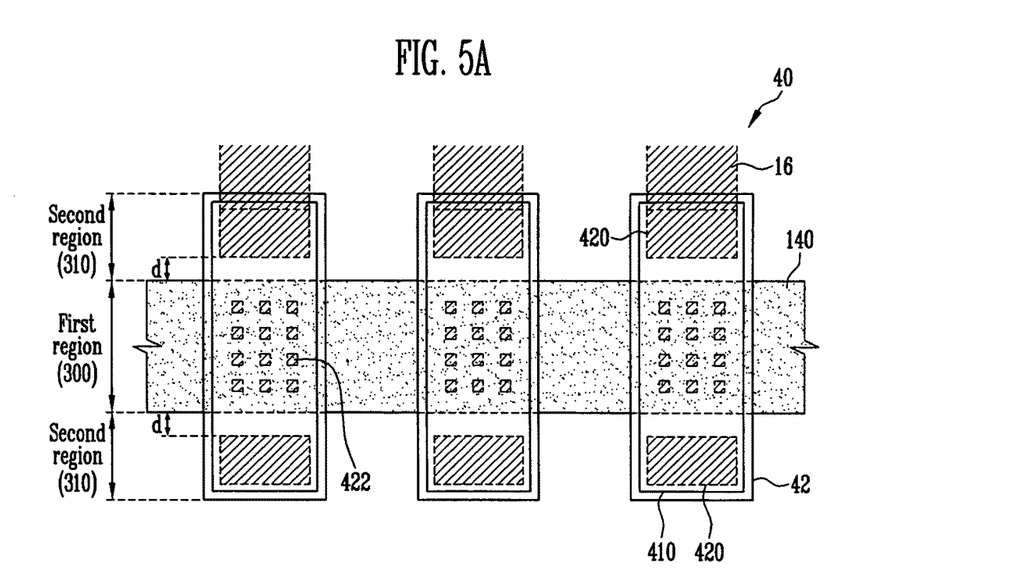
FIGS. 5A and 5B illustrate enlarged plan views of a FPC bonding pad unit according to other embodiments.
Figure 5B:
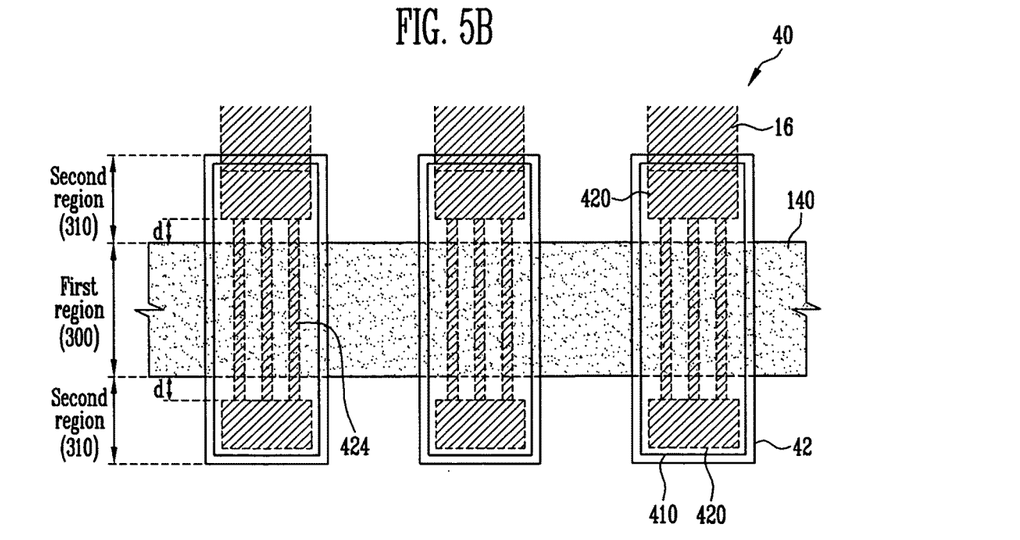

FIGS. 5A and 5B illustrate enlarged plan views of a FPC bonding pad unit according to other embodiments. The FPC bonding pad unit in FIG. 5A is substantially the same as that in FIG. 4A, with the exception of including island-shaped opaque metal pattern 422 under the transparent conductive pattern 410 in the first region 300. The FPC bonding pad unit in FIG. 5B is substantially the same as that in FIG. 4A, with the exception of including a slit-shaped opaque metal pattern 424 under the transparent conductive pattern 410 in the first region 300.

According to the embodiment of FIGS. 5A and 5B, in the first region 300 that overlaps the sealing material 140, a plurality of island-shaped (FIG. 5A) opaque metal patterns 422 or slip-shaped (FIG. 5B) opaque metal patterns 424 may be formed under the transparent conductive pattern 410 to transmit laser light and reduce resistance in the region. That is, the plurality of opaque metal patterns 422 and 424 made of a low resistance material may be provided so that the resistance value of the bonding pad 42 may be reduced, while transmittance in the first region 300 that overlaps the sealing material 140 may be secured. The first region 300 may transmit laser light to melt and harden the sealing material 140 formed under the region.

In FIGS. 5A and 5B, the opaque metal patterns 422 and 424 formed in the first region 300 may be island-shaped and slit-shaped. However, the opaque metal patterns 422 and 424 may have any suitable shapes capable of transmitting laser light irradiation.

As described above, according to embodiments, the FPC bonding pad unit 40 of the touch screen panel directly formed on the upper substrate 10 of the FPD may include bonding pads 42 formed of a transparent conductive material capable of transmitting laser light irradiation. Therefore, the sealing material 140 formed in the region that overlaps the FPC bonding pad unit 40 may be sufficiently hardened by radiating the laser light, and it may be possible to prevent the sealing material from peeling in the region.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A flat panel display (FPD) integrated with a touch screen panel, comprising:
    an upper substrate and a lower substrate facing each other, the upper substrate including a display region and first and second non-display regions surrounding the display region;
    a plurality of sensing patterns on the display region of the upper substrate;
    a plurality of sensing lines on the first non-display region of the upper substrate;
    a flexible printed circuit (FPC) bonding pad unit including a transparent conductive material on the second non-display region of the upper substrate; and
    a sealing material on the second non-display region of the upper substrate, the sealing material connecting the upper and lower substrates and overlapping the FPC bonding pad unit,
    wherein the FPC bonding pad unit includes a plurality of bonding pads directly coupled to the plurality of sensing lines, the bonding pads including the transparent conductive material in regions overlapping the sealing material.

2. The FPD as claimed in claim 1, wherein each bonding pad of the plurality of bonding pads includes a first region that overlaps the sealing material and a second region that does not overlap the sealing material, structures of the first and second regions in each of the bonding pads being different from each other.

3. The FPD as claimed in claim 2, wherein the first region of the bonding pad includes:
    a first insulating layer on the second non-display region of the upper substrate, the first insulating layer including an opening;
    a transparent conductive pattern in the opening of the first insulating layer; and
    a second insulating layer on the first insulating layer and exposing the transparent conductive pattern.

4. The FPD as claimed in claim 3, wherein the transparent conductive pattern and the sensing patterns include a substantially same material.

5. The FPD as claimed in claim 3, further comprising island-shaped opaque metal patterns under the transparent conductive pattern.

6. The FPD as claimed in claim 3, further comprising slit-shaped opaque metal patterns under the transparent conductive pattern.

7. The FPD as claimed in claim 3, wherein the second region of the bonding pad includes:
    an opaque metal pattern on the second non-display region of the upper substrate;
    a first insulating layer on the second non-display region of the upper substrate, the first insulating layer exposing the opaque metal pattern;
    the transparent conductive pattern on the exposed opaque metal pattern, the transparent conductive pattern extending from the first region to the second region; and
    a second insulating layer on the first insulating layer and exposing the transparent conductive pattern.

8. The FPD as claimed in claim 7, wherein the opaque metal pattern and the sensing lines include a substantially same material.

9. The FPD as claimed in claim 7, wherein the opaque metal pattern is separated from the sealing material by a predetermined distance.

10. The FPD as claimed in claim 9, wherein the predetermined distance is about 100 μm.

11. The FPD as claimed in claim 2, wherein the transparent conductive material of the bonding pads extends continuously from the first region to the second region on the upper substrate, at least a portion of the transparent conductive material in the first region being directly on the upper substrate, and an opaque metal pattern being positioned between the transparent conductive material and the upper substrate in the second region.

12. The FPD as claimed in claim 1, wherein portions of the bonding pads overlapping the sealing material on the second non-display region of the upper substrate include only the transparent conductive material.

13. The FPD as claimed in claim 1, wherein the sensing lines are coupled to the bonding pads via opaque metal patterns, the metal patterns being positioned not to overlap the sealing material.

14. The FPD as claimed in claim 1, wherein the sensing lines are coupled to the bonding pads via metal patterns, the bonding pads extending along a first direction, and the metal patterns being spaced apart from the sealing material along the first direction.

15. The FPD as claimed in claim 1, wherein portions of the bonding pads overlapping the sealing material and including the transparent conductive material are directly on the upper substrate.

16. The FPD as claimed in claim 1, wherein the sensing patterns include X sensing patterns and Y sensing patterns in different layers.

17. The FPD as claimed in claim 16, wherein the X sensing patterns are coupled to each other in a first direction, and the Y sensing patterns are coupled to each other in a second direction that intersects the first direction.

18. The FPD integrated with a touch screen panel as claimed in claim 1, wherein the transparent conductive material of the bonding pads is configured to transmit laser light irradiation therethrough toward the sealing material.

19. The FPD as claimed in claim 1, wherein the sealing material is only in a region overlapping the second non-display region of the upper substrate.

20. The FPD as claimed in claim 19, wherein the transparent conductive material of the bonding pads extends along an entire width of the sealing material, the width of the sealing material extending along a direction of a line connecting one sensing line to a respective bonding pad.

21. A flat panel display (FPD) integrated with a touch screen panel, comprising:
    an upper substrate and a lower substrate facing each other, the upper substrate including a display region and first and second non-display regions surrounding the display region;
    a plurality of sensing patterns on the display region of the upper substrate;
    a plurality of sensing lines on the first non-display region of the upper substrate;
    a sealing material on the second non-display region of the upper substrate, the sealing material connecting the upper and lower substrates; and
    a flexible printed circuit (FPC) bonding pad unit on the second non-display region of the upper substrate, the FPC bonding pad unit including a plurality of bonding pads coupled to the plurality of sensing lines, the bonding pads including a transparent conductive material in regions overlapping the sealing material, wherein each bonding pad of the plurality of bonding pads includes a first region that overlaps the sealing material and a second region that does not overlap the sealing material, structures of the first and second regions in each of the bonding pads being different from each other, wherein the first region of the bonding pad includes:
- a first insulating layer on the second non-display region of the upper substrate, the first insulating layer including an opening,
- a transparent conductive pattern in the opening of the first insulating layer, and
- a second insulating layer on the first insulating layer and exposing the transparent conductive pattern, and wherein the second region of the bonding pad includes:
- an opaque metal pattern on the second non-display region of the upper substrate, the opaque metal pattern being separated from the sealing material by about 100 μm,
- a first insulating layer on the second non-display region of the upper substrate, the first insulating layer exposing the opaque metal pattern,
- the transparent conductive pattern on the exposed opaque metal pattern, the transparent conductive pattern extending from the first region to the second region, and
- a second insulating layer on the first insulating layer and exposing the transparent conductive pattern.

* * * * *